United States Patent
Kawata et al.

(10) Patent No.: US 8,260,371 B2
(45) Date of Patent: Sep. 4, 2012

(54) BATTERY PACK AND INFORMATION PROCESSING APPARATUS

(75) Inventors: Shogo Kawata, Kanagawa (JP); Shuichi Sekiya, Saitama (JP); Kiyotada Yokogi, Tokyo (JP)

(73) Assignee: Felica Networks, Inc., Tokyo (JP)

( * ) Notice: Subject to any disclaimer, the term of this patent is extended or adjusted under 35 U.S.C. 154(b) by 322 days.

(21) Appl. No.: 12/575,971

(22) Filed: Oct. 8, 2009

(65) Prior Publication Data

US 2010/0093407 A1   Apr. 15, 2010

(30) Foreign Application Priority Data

Oct. 9, 2008  (JP) ................. P2008262725

(51) Int. Cl.
*G06F 15/16* (2006.01)

(52) U.S. Cl. ....................... 455/572; 455/119
(58) Field of Classification Search .............. 455/119, 455/127.1, 142, 178.1, 572
See application file for complete search history.

(56) References Cited

U.S. PATENT DOCUMENTS

| 5,777,562 A * | 7/1998 | Hoffman ............ 340/870.07 |
| 2010/0134115 A1* | 6/2010 | Ohnuki ................ 324/429 |

FOREIGN PATENT DOCUMENTS

| JP | 2001136082 | 5/2001 |
| JP | 2004-031285 | 1/2004 |
| JP | 2006-101109 | 4/2006 |
| JP | 2006-302733 | 11/2006 |
| JP | 200811597 | 1/2008 |

OTHER PUBLICATIONS

Japanese Office Action issued Feb. 15, 2011, corresponding to Japanese Appln. No. 2008-262725.

* cited by examiner

*Primary Examiner* — Sam Bhattacharya
(74) *Attorney, Agent, or Firm* — K&L Gates LLP

(57) ABSTRACT

A battery pack is provided which includes an antenna coil for generating a magnetic field, a battery cell and a positive pole terminal and a negative pole terminal electrically connected with the battery cell, wherein a resultant of superimposing current from the battery cell or current to the battery cell and a signal from the antenna coil or a signal to the battery is sent from the positive pole terminal or the negative pole terminal, or received from the positive pole terminal or the negative pole terminal.

14 Claims, 6 Drawing Sheets

BATTERY PACK AND INFORMATION PROCESSING APPARATUS

CROSS REFERENCES TO RELATED APPLICATIONS

The present application claims priority to Japanese Priority Patent Application JP 2008-262725 filed in the Japan Patent Office on Oct. 9, 2008, the entire content of which is hereby incorporated by reference.

BACKGROUND

The present application relates to a battery pack and an information processing apparatus.

In recent years, information processing apparatuses such as portable telephones and personal computers equipped with a proximity non-contact communication function are being widely used. In the information processing apparatus equipped with the proximity non-contact communication function, a situation where communication characteristics in time of non-contact communication are difficult to ensure is encountered compared to the IC card (non-contact IC card) equipped with the non-contact communication function.

One of the factors that create the difference in the communication characteristics in time of the non-contact communication is the difference in the antenna characteristics. In the case of the non-contact IC card, the communication characteristics are relatively easy to ensure as design is made in accordance with a card-sized antenna standard (ID-1). In the information processing apparatus equipped with the proximity non-contact communication function, in particular, in the portable telephone, on the other hand, the difference occurs in the antenna characteristics as the shape of the antenna differs depending on the model, and as a result, the difference occurs in the communication characteristics in time of the non-contact communication.

In the case of the portable telephone, the difference occurs in the antenna characteristics as the mounting state of the metal or the magnetic body that tends to influence the antenna characteristics also differs for every model, and as a result, the difference occurs in the communication characteristics in time of the non-contact communication using the portable telephone.

In view of expanding services using the information processing apparatus equipped with the proximity non-contact communication function in the future, the difference is ideally not created in the antenna characteristics regardless of the model, and standardization of the antenna characteristics is desired. However, in the portable telephone in which realization of higher functions and miniaturization is particularly important, the capacity for mounting a standard antenna that can obtain sufficient characteristics is very difficult to ensure for all the models.

SUMMARY

The present application addresses the above-identified, and other issues associated with conventional methods and apparatuses, and it is desirable to provide a new and improved information processing apparatus capable of incorporating an antenna having standard antenna characteristics in all models and capable of ensuring the structure for mounting in the information processing apparatus equipped with the proximity non-contact communication function, and a battery pack used in such information processing apparatus.

According to an embodiment, there is provided a battery pack including an antenna coil for generating a magnetic field, a battery cell; and a positive pole terminal and a negative pole terminal electrically connected with the battery cell. A resultant of superimposing current from the battery cell or current to the battery cell and a signal from the antenna coil or a signal to the battery is sent from the positive pole terminal or the negative pole terminal, or received from the positive pole terminal or the negative pole terminal.

According to such a configuration, an antenna coil generates a magnetic field and a positive pole terminal and a negative pole terminal are electrically connected with the battery cell. And, a resultant of superimposing current from the battery cell or current to the battery cell and a signal from the antenna coil or a signal to the battery is sent from the positive pole terminal or the negative pole terminal, or received from the positive pole terminal or the negative pole terminal. As a result, it is desirable to provide a new and improved information processing apparatus capable of incorporating an antenna having standard antenna characteristics in all models and capable of ensuring the structure for mounting in the information processing apparatus equipped with the proximity non-contact communication function.

The battery pack may further include a resonance circuit for determining a resonance frequency between the antenna coil and the positive pole terminal or the negative pole terminal.

A high pass filter may be arranged between the antenna coil and the positive pole terminal or the negative pole terminal. A low pass filter may be arranged between the battery cell and the positive pole terminal or the negative pole terminal.

The antenna coil and the battery cell may have a stacked structure in which a magnetic body sheet is sandwiched in between.

According to another embodiment of the present invention, there is provided. an information processing apparatus including a battery pack and an information processing apparatus main body for receiving power supply from the battery pack. The battery pack includes, an antenna coil for generating a magnetic field, a battery cell, a positive pole terminal and a negative pole terminal electrically connected with the battery cell, and a resultant of superimposing current from the battery cell or current to the battery cell and a signal from the antenna coil or a signal to the battery is sent to the information processing apparatus main body through the positive pole terminal or the negative pole terminal, or received from the information processing apparatus main body through the positive pole terminal or the negative pole terminal.

A resonance circuit for determining a resonance frequency may be arranged in either the battery pack or the information processing apparatus main body. The resonance circuit may be arranged between the antenna coil and the positive pole terminal or the negative pole terminal.

A high pass filter may be arranged between the antenna coil and the positive pole terminal or the negative pole terminal. A low pass filter may be arranged between the battery cell and the positive pole terminal or the negative pole terminal.

The antenna coil and the battery cell may have a stacked structure in which a magnetic body sheet is sandwiched in between.

The information processing apparatus main body may be a portable telephone.

According to an embodiment described above, there can be provided a new and improved information processing apparatus capable of incorporating an antenna having standard antenna characteristics in all models and capable of ensuring the structure for mounting in the information processing apparatus equipped with the proximity non-contact communication function, and a battery pack used in such information processing apparatus.

Additional features and advantages are described herein, and will be apparent from the following Detailed Description and the figures.

BRIEF DESCRIPTION OF THE FIGURES

FIG. 6 is an explanatory view showing one example of a circuit configuration of a battery pack 100a and a portable telephone main body 150a.

DETAILED DESCRIPTION

Figure 1:
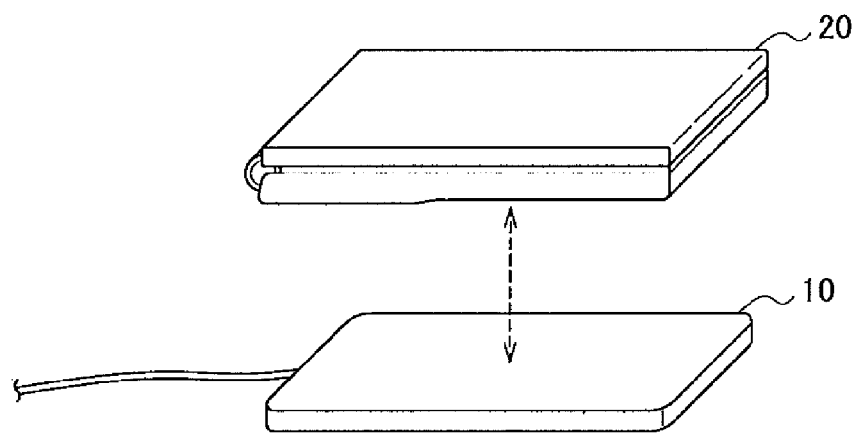
FIG. 1 is an explanatory view describing the outline of a portable telephone 20 according to one embodiment and a proximity non-contact communication using the portable telephone 20.

The present application will be described in detail with reference to the drawings according to an embodiment. Note that, in the specification and the appended drawings, structural elements that have substantially the same function and structure are denoted with the same reference numerals, and repeated explanation of these structural elements is omitted.

First, the outline of a portable telephone according to one embodiment and a proximity non-contact communication using the portable telephone will be described. FIG. 1 is an explanatory view describing the outline of a portable telephone 20 according to one embodiment of the present invention and the proximity non-contact communication using the portable telephone 20. The outline of the portable telephone 20 according to one embodiment of the present invention and the proximity non-contact communication using the portable telephone 20 will be described below using FIG. 1.

The portable telephone 20 according to one embodiment of the present invention is an example of the information processing apparatus of the present invention, and is a device internally mounted with an antenna coil. The antenna coil is mounted inside the portable telephone 20 so that proximity non-contact communication can be carried out with a reader/writer 10 similarly internally mounted with an antenna coil.

When current flows to an antenna coil (not shown) incorporated in the reader/writer 10, a magnetic field generates from the antenna coil of the reader/writer 10. When the portable telephone 20 is brought close to the reader/writer 10 with the magnetic field generating from the antenna coil of the reader/writer 10, the magnetic field generated from the antenna coil of the reader/writer 10 passes through the antenna coil of the portable telephone 20. The current flows through the antenna coil of the portable telephone 20 by electromagnetic induction when the magnetic field generated from the antenna coil of the reader/writer 10 passes through the antenna coil of the portable telephone 20. The proximity non-contact communication is carried out between the reader/writer 10 and the portable telephone 20 using such phenomenon that the current flows through the counterpart by electromagnetic induction.

Load modulation is used for the response from the portable telephone 20 to the reader/writer 10. The load modulation validates or invalidates the load inside a circuit (IC chip) incorporated in the portable telephone 20 to change the impedance of the IC chip with respect to the reader/writer 10. In the reader/writer 10, the amount of change in the power consumption of the IC chip is detected as the amount of voltage change of the portable telephone 20, where the reader/writer 10 can recognize that response from the portable telephone 20 is made if the voltage changes.

In the portable telephone 20 that receives the magnetic field from the reader/writer 10, the response is made to the reader/writer 10 by changing the capacitance of the capacitor arranged inside the portable telephone 20 and changing the resonance frequency. In other words, the impedance of the portable telephone 20 changes by the change in the capacitance. The apparatus that generates the magnetic field such as the reader/writer 10 can determine whether or not the portable telephone 20 made a response with respect to the reception of the electric wave by using the change in impedance.

Figure 2:
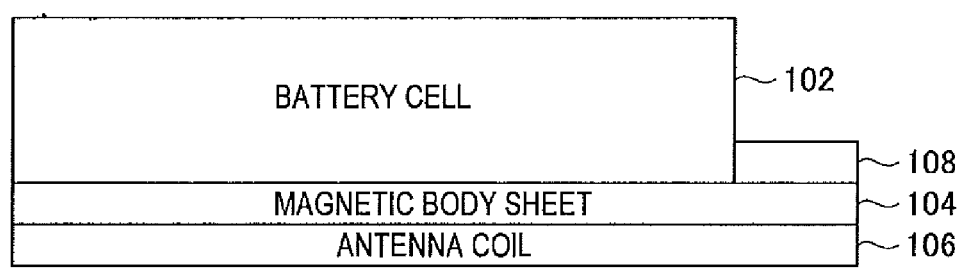
FIG. 2 is an explanatory view schematically showing a battery pack 100 used in the portable telephone 20 according to one embodiment.

The outline of the portable telephone 20 according to one embodiment of the present invention and the proximity non-contact communication using the portable telephone 20 has been described using FIG. 1. The outline of the battery pack used in the portable telephone 20 according to one embodiment of the present invention will now be described. FIG. 2 is an explanatory view schematically showing a battery pack 100 used in the portable telephone 20 according to one embodiment of the present invention. The outline of the battery pack used in the portable telephone 20 according to one embodiment of the present invention will be described below using FIG. 2.

As shown in FIG. 2, the battery pack 100 according to one embodiment of the present invention is configured to include a battery cell 102, a magnetic body sheet 104, an antenna coil 106, and a circuit substrate 108.

The battery cell 102 is a chargeable/dischargeable secondary battery, and may be lithium ion secondary battery, or the like. Although not shown in FIG. 2, the battery pack 100 also has a positive pole terminal and a negative pole terminal, where the current can flow from the battery cell 102 or the battery cell 102 can be charged by the positive pole terminal and the negative pole terminal.

The antenna coil 106 generates the magnetic field by flowing current, and is a coil for proximity non-contact communication using the magnetic field. Nowadays, the antenna coil 106 can be formed very thin.

The circuit substrate 108 is a substrate mounted with various types of circuits for the control of the battery pack 100. For instance, the circuit substrate 108 is mounted with a charging control IC for controlling charging to the battery cell 102, a rechargeable battery protection circuit for protecting the battery cell 102 from overcharge or over-discharge, and the like.

The battery cell 102 normally has the outer skin formed by a metal object. Therefore, when the battery 102 is closely attached to the antenna coil 106, eddy current generates at the outer skin of the battery cell 102 by the generation of the magnetic field from the antenna coil 106 if the antenna coil 106 and the outer skin of the battery cell 102 are closely attached. The generation of the eddy current at the outer skin of the battery cell 102 greatly degrades the communication characteristics of the proximity non-contact communication by the antenna coil 106.

In the battery pack 100 according to the present embodiment, a stacked structure in which the magnetic body sheet 104 is sandwiched between the battery cell 102 and the antenna coil 106 is provided such that the antenna coil 106 and the outer skin of the battery cell 102 do not closely attach. The magnetic body sheet 104 may be a single magnetic layer, or may be a plurality of magnetic layers having different relative permittivity. The magnetic body sheet 104 may have a structure in which a magnetic layer and a nonmagnetic layer are alternately stacked.

As shown in FIG. 2, the generation of the eddy current at the outer skin of the battery cell 102 can be suppressed with the stacked structure in which the magnetic body 104 is sandwiched between the battery cell 102 and the antenna coil 106. Therefore, the relevant stacked structure can alleviate the influence of the metal object formed as the outer skin of the battery cell 102 on the antenna coil 106 and ensure the communication characteristics.

It can be recognized that the shapes and thicknesses of the battery cell 102, the magnetic body sheet 104, and the antenna coil 106 are not limited to those shown in FIG. 2. It can also be recognized that the arrangement of the circuit substrate 108 in the battery pack 100 is not limited to that shown in FIG. 2.

As shown in FIG. 2, the battery pack 100 having a stacked structure in which the magnetic body sheet 104 is sandwiched between the battery cell 102 and the antenna coil 106 is used as the antenna for the proximity non-contact communication. Plastic or the like that does not influence the antenna characteristics can be used for the lid for protecting the battery pack 100. The antenna characteristics (size of antenna coil, condition of magnetic body and metal at the periphery of antenna coil) can be accommodated within a predetermined range regardless of the model of the portable telephone by using plastic and the like for the member of the lid.

Therefore, the difference in the mounting condition and the antenna size of the antenna coil for every model, which is an issue when mounting the antenna with a normal means, can be absorbed by having the portable telephone and other information processing apparatuses use the battery pack 100 as shown in FIG. 2. The characteristics of the antenna coil 106 incorporated in the battery pack 100 become the design index of the reader/writer 10 side, and compatibility of services can be maintained.

The outline of the battery pack 100 according to one embodiment has been described using FIG. 2. The circuit configuration of the battery pack 100 according to one embodiment of the present invention and the portable telephone main body, to which the battery pack 100 is connected, will now be described.

When using the battery pack 100 according to one embodiment shown in FIG. 2, the antenna coil is not incorporated on the main body side of the portable telephone. Therefore, the portable telephone main body and the antenna coil incorporated in the battery pack 100 are connected in some form to perform the proximity non-contact communication using the antenna coil incorporated in the battery pack 100.

Figure 6:
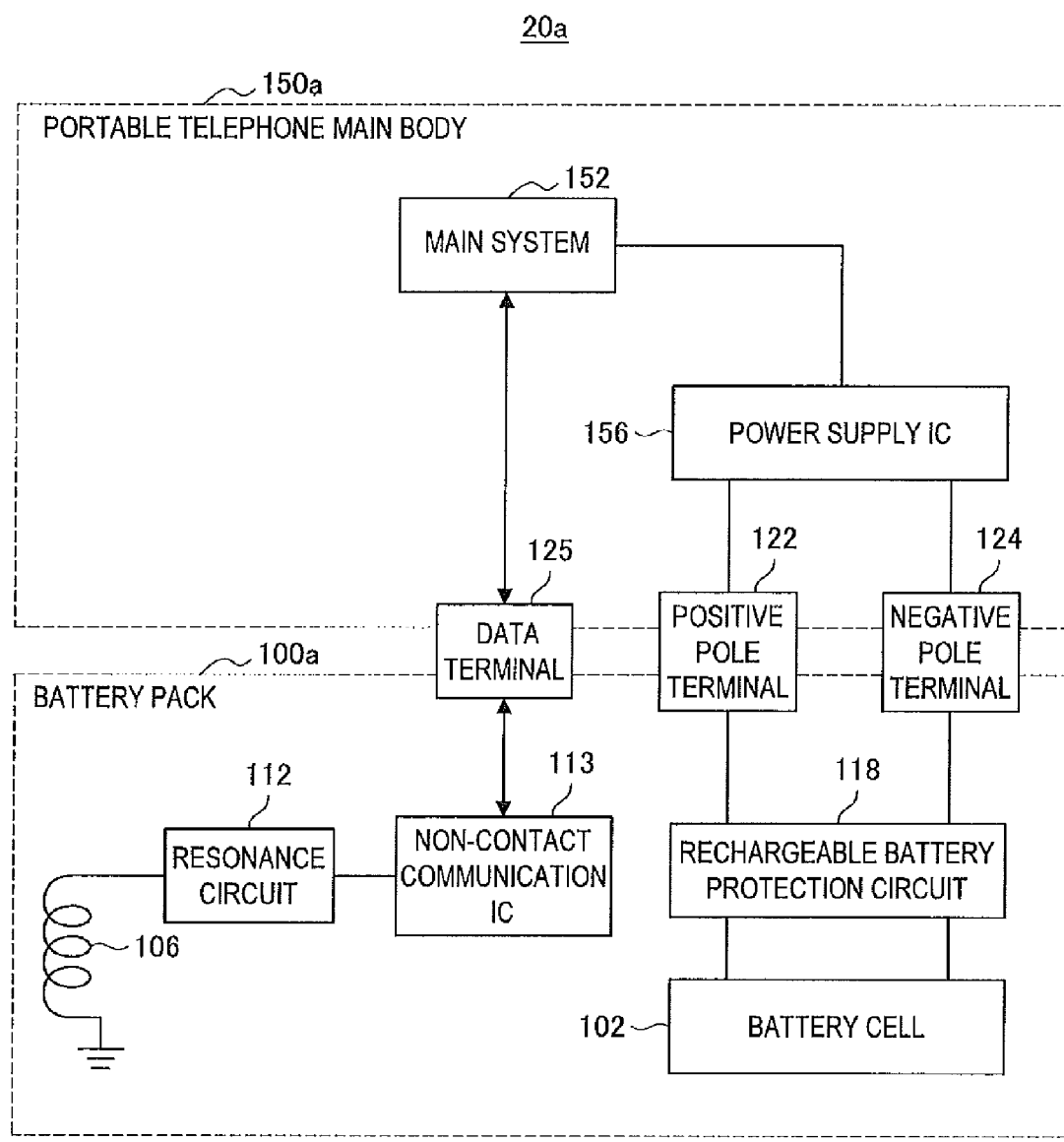

FIG. 6 is an explanatory view showing a configuration of a portable telephone 20*a* including a battery pack 100*a* and a portable telephone main body 150*a*. In FIG. 6, one example of a circuit configuration of the battery pack 100*a* and the portable telephone main body 150*a* is shown.

The battery pack 100*a* shown in FIG. 6 has a stacked structure in which the magnetic body sheet 104 is sandwiched between the battery cell 102 and the antenna coil 106, similar to the battery pack 100 shown in FIG. 2. In FIG. 6, a mode in which the battery pack 100*a* and the portable telephone main body 150*a* are connected to each other with three terminals of a positive pole terminal 122, a negative pole terminal 124, and a data terminal 125 is shown.

In the circuit configuration shown in FIG. 6, the battery pack 100*a* incorporates a resonance circuit 112 for determining the resonance frequency in time of the proximity non-contact communication, and a non-contact communication IC 113 for controlling the proximity non-contact communication. The resonance circuit 112 is configured to include a capacitor having a predetermined capacity. The resonance frequency set by the antenna coil 106 and the resonance circuit 112 is set to 13.56 MHz defined in ISO14443, which is one communication standard of the proximity non-contact communication.

The communication between the non-contact communication IC 113 and a main system 152 incorporated in the portable telephone main body 150*a* is performed using the data terminal 125. The discharging from the battery cell 102 and the charging to the battery cell 102 are performed through the positive pole terminal 122 and the negative pole terminal 124 electrically connected with the battery cell 102.

In the circuit configuration shown in FIG. 6, a rechargeable battery protection circuit 118 incorporated in the battery pack 100*a* is a circuit formed on the circuit substrate 108 of the battery pack 100 shown in FIG. 2. The rechargeable battery protection circuit 118 has a configuration of preventing overcharge and over-discharge to and from the battery cell 102. The detailed configuration of the rechargeable battery protection circuit 118 is not directly related to the present invention, and thus the detailed description will be omitted. Reference is to be made to Japanese Patent Application Laid-Open No. 2008-11597 filed by the applicant of the present invention, for example, for the configuration of the rechargeable battery protection circuit 118.

The antenna coil incorporated in the battery pack and the portable telephone main body can be connected by the configuration of the battery pack 100*a* and the portable telephone main body 150*a* shown in FIG. 6. The proximity non-contact communication using the antenna coil incorporated in the battery pack is enabled by connecting the antenna coil incorporated in the battery pack and the portable telephone main body.

However, in the circuit configuration shown in FIG. 6, the data communication terminal, which is not arranged in the related art, is added as opposed to the connection of the portable telephone main body and the battery pack of the related art. The non-contact communication IC 113 is also incorporated in the battery pack. The incorporation of the non-contact communication IC 113 in the battery pack greatly influences the cost and the size of the battery pack, which is premised on being replaceable. Furthermore, if the terminal is increased, a design that takes into consideration the terminal of increased amount is to be made for the portable telephone main body. Therefore, the issue arises in that the demerits in cost and size become greater than the merits of absorbing the difference in the mounting condition and the antenna size of the antenna coil for every model.

Figure 7:
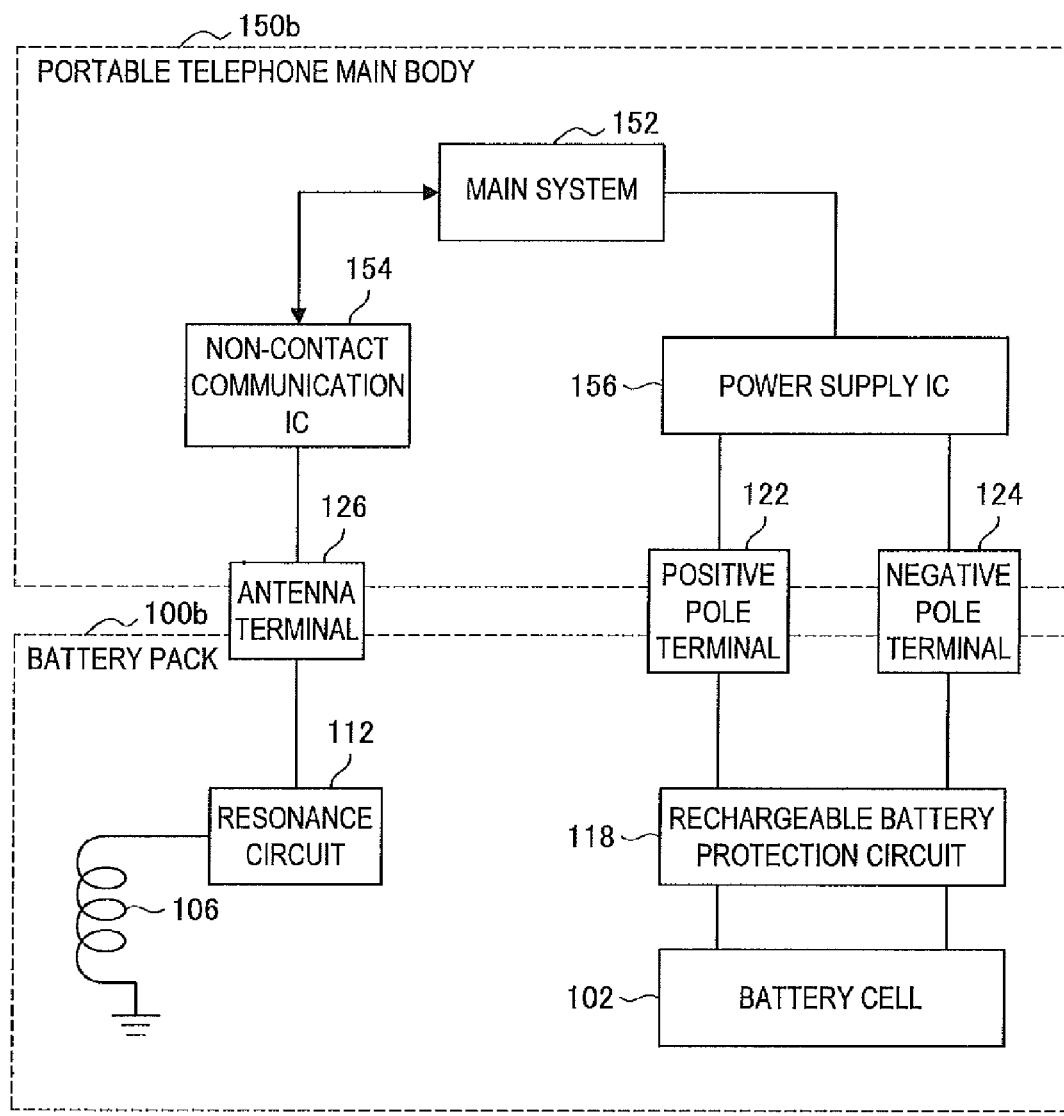
FIG. 7 is an explanatory view showing one example of a circuit configuration of a battery pack 100b and a portable telephone main body 150b.

The configuration of incorporating the non-contact communication IC for controlling the proximity non-contact communication in the portable telephone main body is reviewed. FIG. 7 is an explanatory view showing a configuration of a portable telephone 20b including a battery pack 100b and a portable telephone main body 150b. In FIG. 7, one example of a circuit configuration of the battery pack 100b and the portable telephone main body 150b is shown.

The battery pack 100b shown in FIG. 7 has a stacked structure in which the magnetic body sheet 104 is sandwiched between the battery cell 102 and the antenna coil 106, similar to the battery pack 100 shown in FIG. 2. In FIG. 7, a mode in which the battery pack 100b and the portable telephone main body 150b are connected to each other with three terminals of the positive pole terminal 122, the negative pole terminal 124, and an antenna terminal 126 is shown.

In FIG. 7, a configuration in which a non-contact communication IC 154 is arranged inside the portable telephone main body 150b is shown. A modulation waveform generated by the non-contact communication IC 154 by the control from the main system 152 is transmitted to the antenna coil 106 of the battery pack 100b through the antenna terminal 126. The supply of current from the battery cell 102 and the charging to the battery cell 102 are performed using the positive pole terminal 122 and the negative pole terminal 124.

The non-contact communication IC may not be incorporated in the battery pack by configuring the battery pack 100b and the portable telephone main body 150b as shown in FIG. 7. According to such configuration, the difference in the mounting condition and the antenna size of the antenna coil for every model can be absorbed without arising demerits in cost and size.

However, in the configuration shown in FIG. 7, the antenna terminal 126, which is not arranged in the related art, is added as opposed to the connection of the portable telephone main body and the battery pack of the related art. A new connector is to be prepared as a result of newly adding a terminal, whereby the compatibility with the battery pack of the related art is lost. Furthermore, if the terminal is increased, a design that takes into consideration the terminal of increased amount is to be made for the portable telephone main body.

Thus, the antenna coil incorporated in the battery pack and the portable telephone main body are desirably connected without adding a new terminal and without incorporating the non-contact communication IC in the battery pack. The circuit configuration of the portable telephone main body and the battery pack having the above configuration will be described below.

Figure 3:
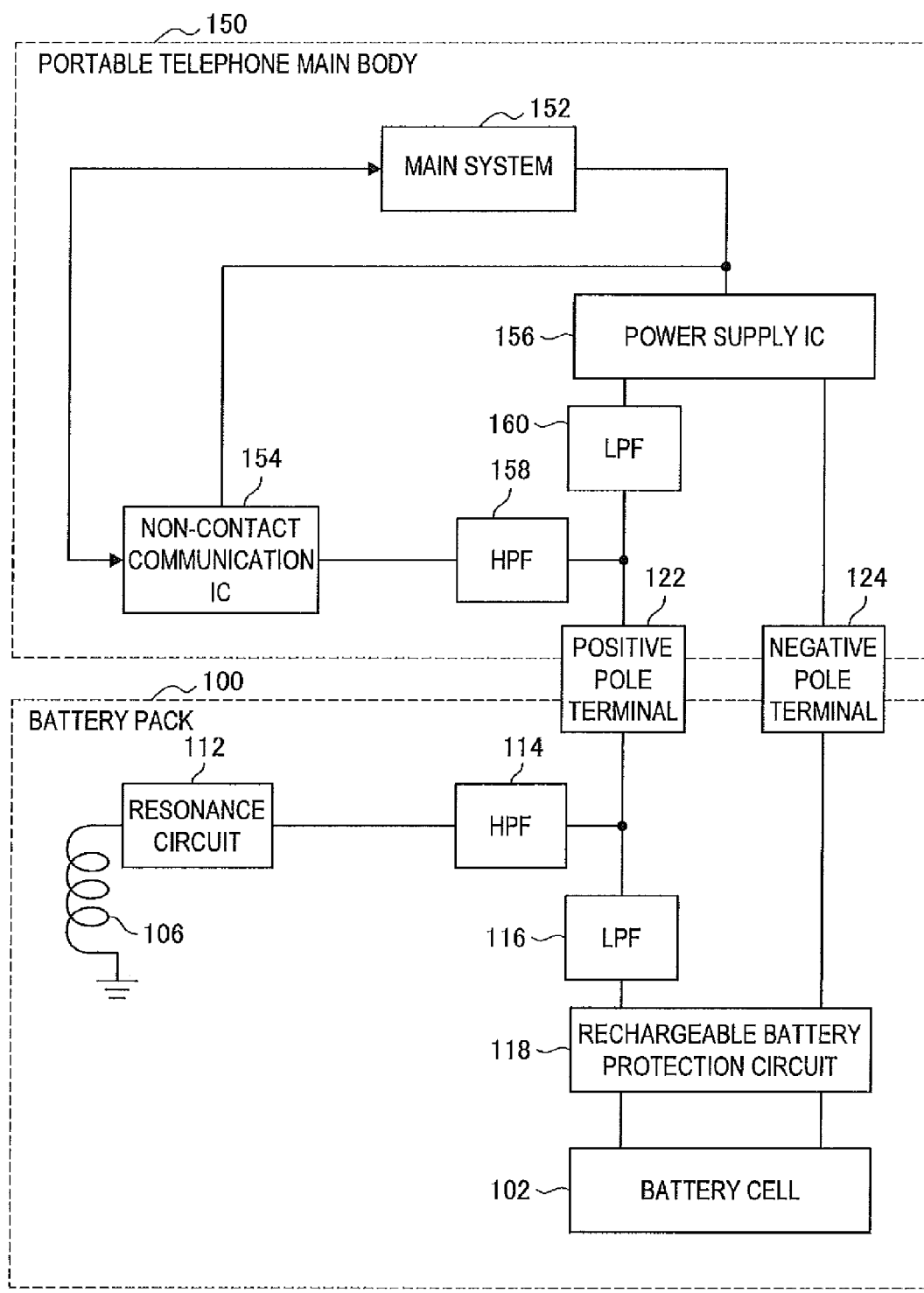
FIG. 3 is an explanatory view showing a configuration of the portable telephone 20 according to one embodiment.

FIG. 3 is an explanatory view showing a configuration of the portable telephone 20 according to one embodiment of the present invention. The configuration of the portable telephone 20 according to one embodiment will be described using FIG. 3.

As shown in FIG. 3, the portable telephone 20 according to one embodiment of the present invention is configured to include the battery pack 100 and the portable telephone main body 150.

The battery pack 100 is configured to include the battery cell 102, the antenna coil 106, the resonance circuit 112, a HPF (High Pass Filter) 114, a LPF (Low Pass Filter) 116, and the rechargeable battery protection circuit 118. The battery cell 102, the antenna coil 106, the resonance circuit 112, and the rechargeable battery protection circuit 118 are the same as those shown in FIGS. 6 and 7, and thus the detailed descriptions thereof will be omitted.

The portable telephone main body 150 is configured to include the main system 152, the non-contact communication IC 154, a power supply IC 156, the HPF 158, and the LPF 160.

The HPFs 114, 158 are filters for passing the band pass of greater than or equal to a predetermined frequency (cutoff frequency) and cutting off (attenuating) the band pass smaller than the cutoff frequency, and are configured by a capacitor and a resistor. The LPFs 116, 160 are filters for passing the band pass of smaller than or equal to a predetermined frequency (cutoff frequency) and cutting off (attenuating) the band pass greater than the cutoff frequency, and are configured by a capacitor or a coil, and a resistor.

The power supply IC 156 of the portable telephone main body 150 and the rechargeable battery protection circuit 118 of the battery pack 100 are connected by way of the LPF 116 and the LPF 160. Since the battery cell 102 is a DC power supply, the current from the battery cell 102 can pass through the LPF 116 and the LPF 160. Therefore, the DC power from the battery cell 102 can be supplied to the power supply IC 156 via the rechargeable battery protection circuit 118, the LPF 116, and the LPF 160.

The power supply IC 156 receiving the supply of the DC power from the battery pack 100 supplies the DC power to the main system 152 and the non-contact communication IC 154. The main system 152 is configured by a CPU (Central Processing Unit), a memory, a portable telephone wireless communication system, and the like. In an embodiment, the DC power from the battery pack 100 may be directly supplied to the power supply terminal of the non-contact communication IC 154 without passing through the power supply IC 156.

The DC power from the battery cell 102 is not directly supplied to the antenna coil 106 inside the battery pack 100 connected through the HPF 114 and the HPF 158, or the transmission terminal and the reception terminal of the non-contact communication IC 154 inside the portable telephone main body 150. Similar to when charging the battery cell 102, the DC current from the power supply IC 156 can be supplied only to the battery cell 102, and thus the battery cell 102 can be charged without arising any issues and without influencing other circuits.

An arbitrary type may be selected as long as the filter characteristics of the HPFs 114, 158 cuts off the DC power from the battery cell 102 and does not influence the proximity non-contact communication by the antenna coil 106 and the resonance circuit 112. Similarly, an arbitrary type may be selected as long as the filter characteristics of the LPFs 116, 160 passes the DC power from the battery cell 102 and cuts off the high frequency signal by the antenna coil 106 and the resonance circuit 112.

Consider a state in which the battery pack 100 and the portable telephone main body 150 are configured as in FIG. 3, and the portable telephone 20 is placed over the reader/writer 10 with the battery pack 100 and the portable telephone main body 150 connected with the positive pole terminal 122 and the negative pole terminal 124.

When the portable telephone 20 is placed over the reader/writer 10, the modulation wave transmitted from the reader/writer 10 is transmitted to the antenna coil 106 of the battery pack 100. The modulation wave transmitted from the reader/writer 10 is a high frequency wave including a carrier wave and a modulation component. Thus, the modulation wave transmitted from the reader/writer 10 and received by the antenna coil 106 can pass through the HPF 114. The modulation wave transmitted from the reader/writer 10 does not pass through the LPF 116 and the LPF 160, and thus does not influence the DC power supplied from the battery cell 102 to the power supply IC 156.

Therefore, the modulation wave received by the antenna coil 106 can be superimposed on the DC voltage supplied by the battery cell 102. The modulation wave received by the antenna coil 106 and superimposed on the DC voltage supplied by the battery cell 102 has the DC component cut off by the HPF 158 and only the modulation wave component taken out.

The portable telephone 20 can acquire information transmitted from the reader/writer 10 by demodulating the modulation wave reaching the reception terminal of the non-contact communication IC 154 through the HPF 158 at the non-contact communication IC 154. The information demodulated in the non-contact communication IC 154 is sent to the main system 152 and subjected to information processing in the main system 152, and the return data is transmitted to the non-contact communication IC 154.

The non-contact communication IC 154 can provide a response to the reader/writer 10 by performing load modulation, similar to the response in a general proximity non-contact communication. In making a response to the reader/writer 10 as well, the modulation wave is superimposed on the DC voltage supplied by the battery cell 102, similar to when receiving from the reader/writer 10. The modulation wave does not pass through the LPF 116 and the LPF 160, and thus does not influence the DC power supplied from the battery cell 102 to the power supply IC 156.

Figure 4A:
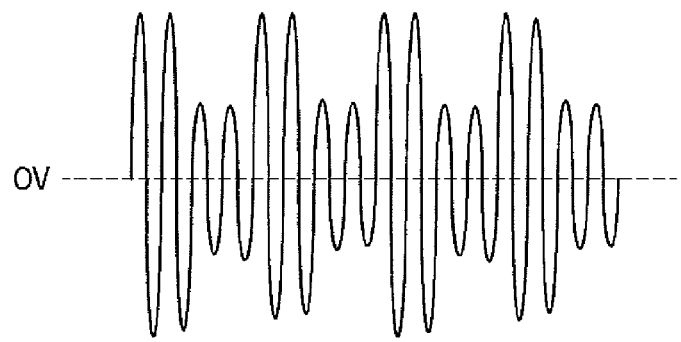
FIG. 4A is an explanatory view showing one example of a waveform of the modulation wave received by an antenna coil 106.
Figure 4B:
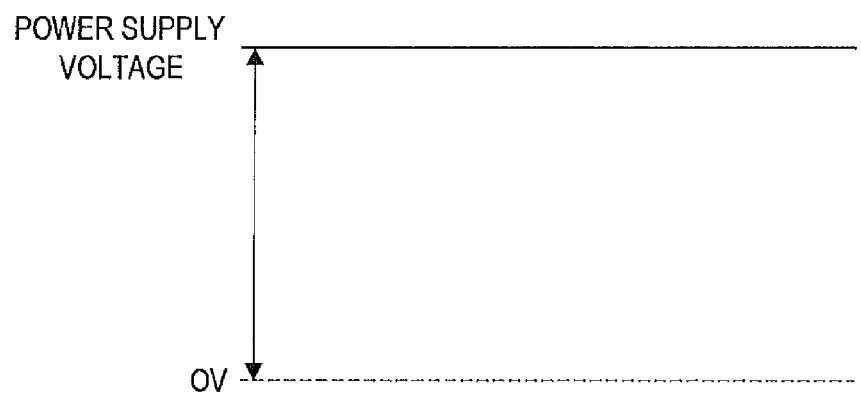
FIG. 4B is an explanatory view showing one example of a waveform of the DC voltage supplied by a battery cell 102.
Figure 4C:
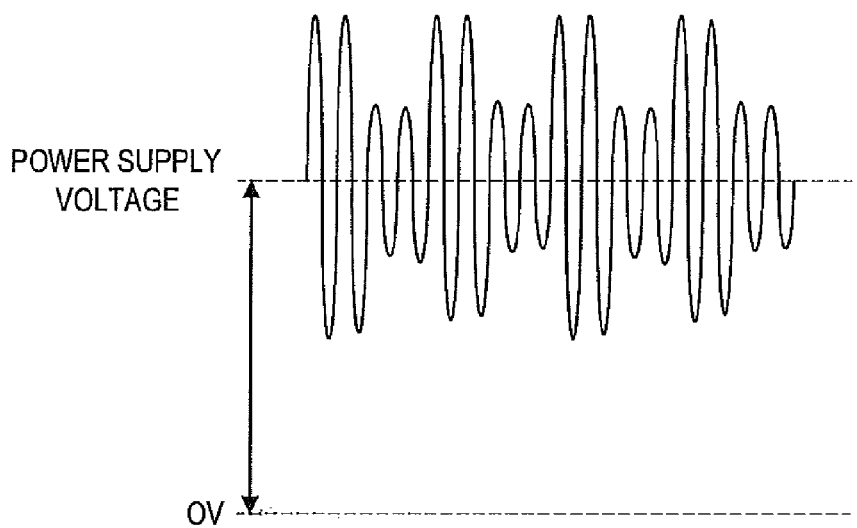
FIG. 4C is an explanatory view showing one example of a waveform of when the modulation wave received by the antenna coil 106 and the DC voltage supplied by the battery cell 102 are superimposed.

FIGS. 4A to 4C are explanatory views showing examples of waveforms of the modulation wave received by the antenna coil 106, the DC voltage supplied by the battery cell 102, and the resultant of superimposing the modulation wave and the DC voltage in the portable telephone 20 according to one embodiment of the present invention.

FIG. 4A is an explanatory view showing one example of a waveform of the modulation wave received by the antenna coil 106, and FIG. 4B is an explanatory view showing one example of a waveform of the DC voltage supplied by the battery cell 102. FIG. 4C is an explanatory view showing one example of a waveform of when the modulation wave received by the antenna coil 106 and the DC voltage supplied by the battery cell 102 are superimposed.

The waveform shown in FIG. 4A is an example of the waveform of the modulation wave flowing between the resonance circuit 112 and the HPF 114, and between the non-contact communication IC 154 and the HPF 158 in the configuration of the portable telephone 20 shown in FIG. 3. The waveform shown in FIG. 4B is an example of the waveform of the DC voltage flowing between the LPF 116 and the rechargeable battery protection circuit 118 and between the power supply IC 156 and the LPF 160 in the configuration of the portable telephone 20 shown in FIG. 3. The waveform shown in FIG. 4C is an example of the waveform in which the modulation wave and the DC voltage flowing between the HPF 114 and the LPF 116, and between the HPF 158 and the LPF 160 are superimposed in the configuration of the portable telephone 20 shown in FIG. 3.

Thus, the antenna coil 106 can be incorporated in the battery pack 100 without adding terminals by configuring the portable telephone 20 such that the modulation wave received by the antenna coil 106 and the DC power supply voltage supplied by the battery cell 102 can be superimposed. The role of the power supply and the non-contact communication can be provided to one connector by inserting the HPF and the LPF in the path of the DC power supply supplied by the battery cell 102, whereby the battery pack 100 can be formed with the shape of the connector similar to that in the related art. Therefore, the portable telephone main body 150 can also be designed similar to the related art and the terminal is not increased, whereby the cost in terms of manufacturing can be suppressed.

The configuration of the portable telephone 20 according to one embodiment of the present invention has been described above. In the above-described embodiment, the HPFs 114, 158 and the LPFs 116, 160 are arranged on the path connected by the positive pole terminal 122, but the present invention is not limited to such example. The HPF and the LPF may be arranged on the path connected by the negative pole terminal 124. It can be recognized that the DC voltage and the modulation wave can be similarly superimposed even if the HPF and the LPF are arranged on the path connected by the negative pole terminal 124.

Figure 5:
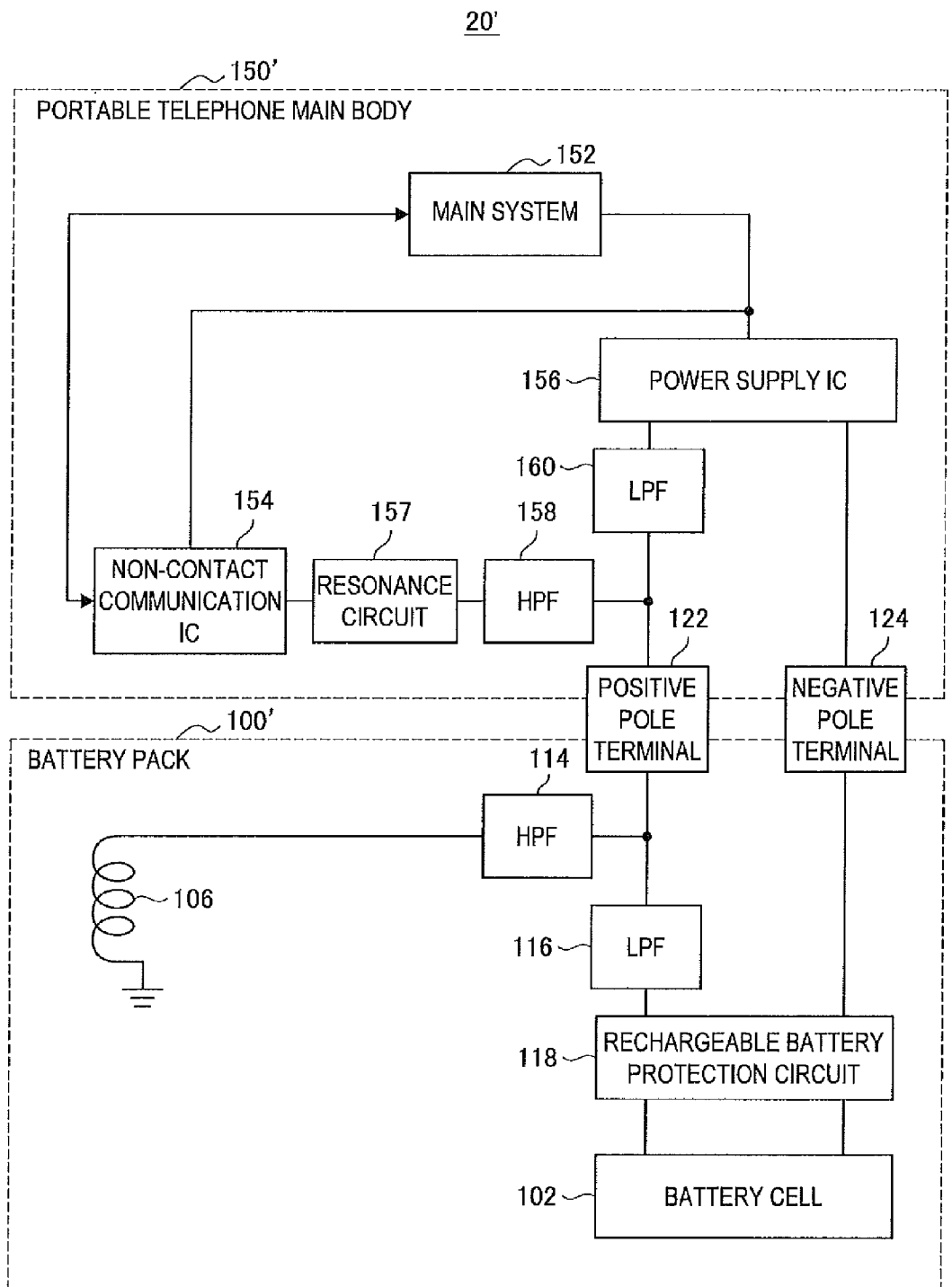
FIG. 5 is an explanatory view showing a variant of the configuration of the portable telephone according to one embodiment.

In the above-described embodiment, a case where the configuration in which the resonance circuit 112 is incorporated in the battery pack 100 is adopted has been described, but the present invention is not limited to such example. FIG. 5 is an explanatory view showing a variant of the configuration of the portable telephone 20 according to one embodiment of the present invention. In FIG. 5, a portable telephone 20' including the battery pack 100' and a portable telephone main body 150' is shown, and the circuit configuration of the battery pack 100' and the portable telephone main body 150' is shown.

In addition to the configuration of the portable telephone 20 shown in FIG. 3, a resonance circuit 157 may be arranged in the portable telephone main body 150', as shown in FIG. 5. The proximity non-contact communication using the antenna coil 106 can be performed without arising any issues even if the resonance circuit 157 is arranged in the portable telephone main body 150'.

A case where the battery pack 100' is connected to the portable telephone not having the proximity non-contact communication function or having the antenna coil arranged on the portable telephone main body side can be responded by arranging the resonance circuit 112 in the portable telephone main body 150'.

In other words, when the battery pack 100' is connected to the relevant portable telephone, the proximity non-contact communication using the antenna coil 106 is not possible as the resonance circuit (capacitor) does not exist in the battery pack 100'. Therefore, even if the battery pack 100' is connected to the portable telephone not having the proximity non-contact communication function or having the antenna coil arranged on the portable telephone main body side, the portable telephone can be used without any issues while maintaining compatibility.

As described above, according to one embodiment of the present invention, the antenna having standard characteristics can be incorporated in any model and the structure for mounting can be ensured by arranging the antenna coil 106 inside the battery pack 100.

The terminal for the proximity non-contact communication can also be used for the positive pole terminal or the negative pole terminal existing from the related art by superimposing the high frequency transmitted from the antenna coil 106 and transmitted to the antenna coil 106 and the DC voltage transmitted from the battery cell 102 and transmitted to the battery cell 102. The influence of the high frequency on the battery cell 102 and the influence of the DC voltage on the proximity non-contact communication can be prevented by appropriately arranging the high-pass filter and the low-pass filter in the circuit.

Moreover, the influence of the metal object at the outer skin of the battery cell on the proximity non-contact communication using the antenna coil 106 can be reduced by adopting the stacked structure in which the magnetic body sheet 104 is sandwiched between the battery cell 102 and the antenna coil 106.

In the above-described embodiment, the portable telephone 20 has been described as an example of the information processing apparatus of the present invention, but it can be recognized that the information processing apparatus is not limited to the portable telephone in the present invention. For instance, the battery pack 100 according to one embodiment of the present invention may be used in small information processing terminals such as PDA (Personal Digital Assistant), video games, and the like.

In the above-described embodiment, the battery pack 100 has the stacked structure in which the magnetic body sheet 104 is sandwiched between the battery cell 102 and the antenna coil 106, but the present invention is not limited to such example. For instance, a structure of stacking the battery cell 102 and the antenna coil 106 may be adopted if a material that does not influence the proximity non-contact communication by the antenna coil 106 can be used for the outer skin of the battery cell 102.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
an antenna coil for generating a magnetic field;
a battery cell; and
a positive pole terminal and a negative pole terminal electrically connected with the battery cell, wherein
a resultant of superimposing current from the battery cell or current to the battery cell and a signal from the antenna coil or a signal to the battery is sent from the positive pole terminal or the negative pole terminal, or received from the positive pole terminal or the negative pole terminal.

2. The battery pack according to claim 1, further comprising a resonance circuit for determining a resonance frequency between the antenna coil and the positive pole terminal or the negative pole terminal.

3. The battery pack according to claim 1, wherein a high pass filter is arranged between the antenna coil and the positive pole terminal or the negative pole terminal.

4. The battery pack according to claim 1, wherein a low pass filter is arranged between the battery cell and the positive pole terminal or the negative pole terminal.

5. The battery pack according to claim 1, wherein the antenna coil and the battery cell have a stacked structure in which a magnetic body sheet is sandwiched in between.

6. The battery pack according to claim 1, wherein the signal from the antenna coil is superimposed on the current from the battery cell in the battery pack.

7. An information processing apparatus comprising:
a battery pack; and
an information processing apparatus main body for receiving power supply from the battery pack, wherein
the battery pack includes,
an antenna coil for generating a magnetic field,
a battery cell,
a positive pole terminal and a negative pole terminal electrically connected with the battery cell, and
a resultant of superimposing current from the battery cell or current to the battery cell and a signal from the antenna coil or a signal to the battery is sent to the information processing apparatus main body through the positive pole terminal or the negative pole terminal, or received from the information processing apparatus main body through the positive pole terminal or the negative pole terminal.

8. The information processing apparatus according to claim 7, wherein a resonance circuit for determining a resonance frequency is arranged in either the battery pack or the information processing apparatus main body.

9. The information processing apparatus according to claim 8, wherein the resonance circuit is arranged between the antenna coil and the positive pole terminal or the negative pole terminal.

10. The information processing apparatus according to claim 7, wherein a high pass filter is arranged between the antenna coil and the positive pole terminal or the negative pole terminal.

11. The information processing apparatus according to claim 7, wherein a low pass filter is arranged between the battery cell and the positive pole terminal or the negative pole terminal.

12. The information processing apparatus according to claim 7, wherein the antenna coil and the battery cell have a stacked structure in which a magnetic body sheet is sandwiched in between.

13. The information processing apparatus according to claim 7, wherein the information processing apparatus main body is a portable telephone.

14. The battery pack according to claim 7, wherein the signal from the antenna coil is supplied from the battery pack to the information processing main body through at least one of the positive pole terminal and the negative pole terminal.

* * * * *